(12) United States Patent
Zhou

(10) Patent No.: US 11,374,825 B2
(45) Date of Patent: Jun. 28, 2022

(54) METHOD AND APPARATUS FOR PREDICTING BANDWIDTH

(71) Applicant: Beijing Dajia Internet Information Technology Co., Ltd., Beijing (CN)

(72) Inventor: Chao Zhou, Beijing (CN)

(73) Assignee: Beijing Daijia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/557,445

(22) Filed: Dec. 21, 2021

(65) Prior Publication Data

US 2022/0116281 A1 Apr. 14, 2022

Related U.S. Application Data

(63) Continuation of application No. PCT/CN2020/105292, filed on Jul. 28, 2020.

(30) Foreign Application Priority Data

Sep. 23, 2019 (CN) .......................... 201910898740.4

(51) Int. Cl.
*H04L 41/147* (2022.01)
*G06N 3/04* (2006.01)
(Continued)

(52) U.S. Cl.
CPC ......... *H04L 41/147* (2013.01); *G06N 3/0454* (2013.01); *H04L 41/145* (2013.01); *H04L 43/0894* (2013.01)

(58) Field of Classification Search
CPC ....... H04L 43/08; H04L 43/16; G06K 9/6215; G06K 9/6228; G06N 20/00
See application file for complete search history.

(56) References Cited

U.S. PATENT DOCUMENTS

| 2019/0129819 A1* | 5/2019 | Guo ..................... G06N 3/0454 |
| 2020/0098139 A1* | 3/2020 | Kaplanyan ........... G06N 3/0481 |
| 2021/0012902 A1* | 1/2021 | Chawla .................. G06K 9/628 |

FOREIGN PATENT DOCUMENTS

| CN | 101827014 A | 9/2010 |
| CN | 104050319 A | 9/2014 |
| (Continued) |

OTHER PUBLICATIONS

English Translation of CN111327441 (Year: 2020).*
(Continued)

*Primary Examiner* — Philip C Lee
(74) *Attorney, Agent, or Firm* — Meunier Carlin & Curfman LLC

(57) ABSTRACT

Disclosed are a method and apparatus for bandwidth prediction, an electronic device and a storage medium. The method includes: acquiring active network states at a plurality of time points within a historical time period, and setting network states, missing from the plurality of time points, to be preset values; generating a first network state sequence from the network states at the plurality of time points according to a chronological order; converting, by using feature information between the missing network states and the real network state in an auto-encoder, the missing network states in the first network state sequence into predicted network states, so as to obtain a second network state sequence output by the auto-encoder; and predicting a network bandwidth according to the second network state sequence.

13 Claims, 6 Drawing Sheets

(51) Int. Cl.
*H04L 43/0894* (2022.01)
*H04L 41/14* (2022.01)

(56) References Cited

FOREIGN PATENT DOCUMENTS

| | | | |
|---|---|---|---|
| CN | 104064023 | A | 9/2014 |
| CN | 109728939 | A | 5/2019 |
| CN | 109785629 | A | 5/2019 |
| CN | 109800483 | A | 5/2019 |
| CN | 110400010 | A | 11/2019 |
| CN | 110474815 | A | 11/2019 |
| CN | 110798365 | A | 2/2020 |
| CN | 111327441 | A | 6/2020 |
| EP | 1103953 | A3 | 9/2002 |
| EP | 2701408 | A1 | 2/2014 |

OTHER PUBLICATIONS

English Translation of CN109800483 (Year: 2019).*
English Translation of First Office Action issued in CN 201910898740.4 dated Feb. 19, 2021.
International Search Report issued in PCT/CN2020/105292, dated Apr. 1, 2021.
English Translation of Notification of Intention to Grant issued in CN 201910898740.4 dated Jul. 21, 2021.

* cited by examiner

METHOD AND APPARATUS FOR PREDICTING BANDWIDTH

CROSS-REFERENCE TO RELATED APPLICATIONS

The present application is a continuation of International Application No. PCT/CN2020/105292, filed on Jul. 28, 2020, which is based on and claims the priority to Chinese patent application No. 201910898740.4 filed to the China National Intellectual Property Administration on Sep. 23, 2019, and entitled "Method and Apparatus for Bandwidth Prediction, Electronic Device and Storage Medium". The disclosure of above application is herein incorporated by reference in their entireties.

FIELD

The present application relates to the field of networks, in particular to a method and apparatus for bandwidth prediction, an electronic device and a storage medium.

BACKGROUND

Bandwidth prediction is a basis of network optimization. Accurate bandwidth prediction is especially important for network congestion control and code rate adaptation of an application layer. Generally speaking, the bandwidth prediction is performed through certain modeling based on historical network state data, and this type of prediction modes is performed under an assumption that the network historical state data are known.

SUMMARY

The present application provides a method and apparatus for bandwidth prediction, an electronic device and a storage medium.

According to a first aspect of an embodiment of the present application, a method for bandwidth prediction is provided, including: acquiring valid network states at a plurality of time points within a historical time period, and setting missing network states at the plurality of time points as preset values; generating a first network state sequence from network states at the plurality of time points according to a chronological order; inputting the first network state sequence into a trained autoencoder, and obtaining a second network state sequence output by the autoencoder by converting the missing network states in the first network state sequence into predicted network states based on feature information between the missing network states and real network states in the autoencoder, wherein the network states at the plurality of time points include the valid network states and/or the missing network states; and predicting a network bandwidth based on the second network state sequence.

According to a second aspect of an embodiment of the present application, an apparatus for bandwidth prediction is provided, including: a collecting unit, configured to acquire valid network states at a plurality of time points within a historical time period, and set missing network states at the plurality of time points as preset values; a generating unit, configured to generate a first network state sequence from network states at the plurality of time points according to a chronological order; an adjusting unit, configured to input the first network state sequence into a trained autoencoder, and obtain a second network state sequence output by the autoencoder by converting the missing network states in the first network state sequence into predicted network states base on feature information between the missing network states and real network states in the autoencoder, wherein the network states at the plurality of time points include the valid network states and/or the missing network states; and a predicting unit, configured to predict a network bandwidth based on the second network state sequence.

According to a third aspect of an embodiment of the present application, an electronic device is provided, including: a processor, and a memory configured to store an executable instruction of the processor, wherein the processor is configured to execute the instruction, so as to implement the bandwidth prediction method according to any one of the first aspect of the embodiment of the present application.

According to a fourth aspect of an embodiment of the present application, a nonvolatile readable storage medium is provided. An instruction in the storage medium, when executed by a processor of an electronic device, causes the electronic device to be capable of executing the bandwidth prediction method according to any one of the first aspect of the embodiment of the present application.

According to a fifth aspect of an embodiment of the present application, a computer program product is provided. The computer program product, when running on an electronic device, causes the electronic device to execute and implement the above first aspect of the embodiment of the present application and any possibly involved method of the first aspect.

DETAILED DESCRIPTION OF THE EMBODIMENTS

Figure 1:
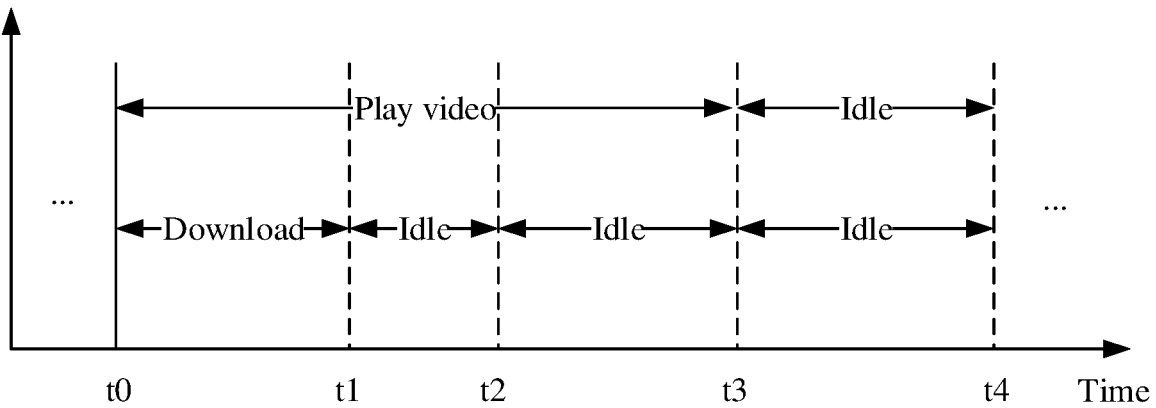
FIG. 1 is a schematic diagram of a download condition during video watching according to an embodiment of the present disclosure.

Some words appearing herein are explained below.

1. The term "and/or" in embodiments of the present application describes an association relationship of association objects, and represents that there may be three relationships, for example, A and/or B, may represent: A exists alone, A and B exist at the same time, and B exists alone. A character "/" generally represents that the previous and later association objects are in an "or" relationship.

2. The term "electronic device" in the embodiments of the present application refers to a device composed of an integrated circuit, a transistor, an electronic tube and other electronic parts and components, and applying electronic technology (including) software to play a role, and includes an electronic computer and a robot, a numerical control or programed control system and the like controlled by the electronic computer.

3. The term "Autoencoder" in the embodiments of the present application belongs to unsupervised learning, does not need to mark a training sample, and is generally composed of three layers of networks, wherein the quantity of neurons in an input layer is equal to the quantity of neurons in an output layer, and the quantity of neurons in a hidden layer is less than that of the input layer and that of the output layer. During network training, a new signal will generate for each training sample at the output layer through the network, and an objective of network learning is to make an output signal be similar to an input signal as much as possible. After training of the autoencoder is finished, the autoencoder may be composed of the two parts, the input layer and the hidden layer firstly, and thus this network may be used to compress the signals; then the hidden layer and the output layer, so that the compressed signal may be restored.

4. The term "Timeslot (TS)" in the embodiments of the present application is a minimum unit for transferring circuit exchange summary information, is dedicated to one part of serial self-multiplexing of timeslot information of a certain single channel, and is a time slice in time division multiplexing (TDM).

5. The term "bandwidth" in the embodiments of the present application usually refers to a frequency band width occupied by the signal; and in the case that it is used for describing a channel, the bandwidth refers to a maximum frequency band width of a signal capable of effectively passing through the channel. As for an analog signal, the bandwidth is also known as a frequency bandwidth taking Hz as a unit. As for a digital signal, the bandwidth refers to a data volume that can pass through a link within a unit time. Because transmission of the digital signal is completed through modulation of the analog signal, in order to be distinguished from an analog bandwidth, the bandwidth of a digital channel is generally described directly through a baud rate or a symbol rate.

6. The term "Sigmoid function" in the embodiments of the present application is usually used as a threshold function of a neural network to map a variable between 0 and 1 due to its properties of monotone increasing and inverse function monotone increasing.

The application scenarios described in the embodiments of the present application are intended to illustrate the technical solution of the embodiments of the present application more clearly, and do not constitute limitation to the technical solution provided by the embodiments of the present application. The person of ordinary skill in the art can know that the technical solution provided by the embodiments of the present application is also suitable for similar technical problems along with appearing of a new application scenario.

For example, in an actual network, collecting of network states relies on a state of actual transmission. For example, in the case of downloading a file, a download speed may be approximately equivalent to a current download bandwidth. However, there are many scenarios in which the network does not transmit data constantly, in the case that the network does not transmit the data, the network state cannot be informed, that is, recording of network historical states is missing.

One typical scenario is to watch a short video, as shown in FIG. 1: a user begins to watch a short video at a t0 moment, the video is downloaded completely at a t0-t1 moment, and information such as the bandwidth and delay of the network may be obtained in this period. Then a watching behavior of the user may last until t2, at which time the video just finished played, but the network does not download data at an interval of t1-t2, and thus any state information of the network cannot be obtained; and at a t2-t3 moment, the user possibly continues watching the video, but the video is read from a local cache and is subjected to carousel, and the network also does not download the data in this time interval. Finally, before next watching, the user may stay for a period of time, namely, t3-t4. Generally speaking, in the period of t0-t4, there is data downloading only in t0-t1, and the network state can be informed; and in the period of t1-t4, the network state cannot be informed, under the premise of missing the historical network states, how to estimate the bandwidth at a t4 moment is one of the challenges facing by network prediction.

Therefore, the present application proposes a method for bandwidth prediction based on an automatic coding machine. Under the condition of missing historical network states, the missing network states are filled through an automatic coding machine, accurate bandwidth prediction is performed under the condition of the network historical state data. The automatic coding machine therein may also be a form of an autoencoder.

Figure 2:
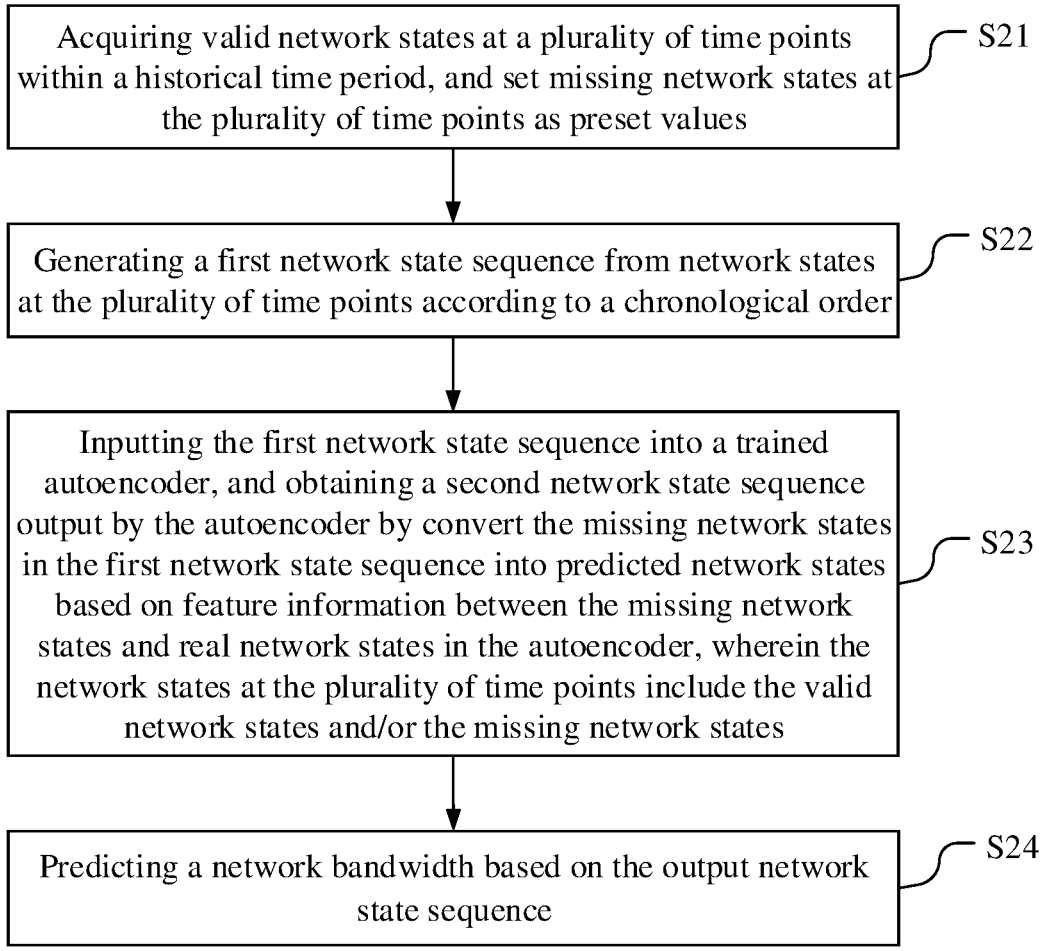
FIG. 2 is a schematic diagram of a method for bandwidth prediction according to an embodiment of the present disclosure.

FIG. 2 is a flow diagram of a method for bandwidth prediction according to an embodiment of the present disclosure, as shown in FIG. 2, the following steps are included.

In S21, valid network states at a plurality of time points within a historical time period are acquired, and missing network states at the plurality of time points are set as preset values.

In S22, a first network state sequence is generated from network states at the plurality of time points according to a chronological order.

In S23, the first network state sequence is input into a trained autoencoder, and a second network state sequence output by the autoencoder is obtained by converting the missing network states in the first network state sequence into predicted network states based on feature information between the missing network states and real network states in the autoencoder. The network states at the plurality of time points include the valid network states and/or the missing network states.

In S24, a network bandwidth is predicted based on the second network state sequence.

The first network state sequence is generated according to the chronological order, a network state at an earlier time point is ranked higher in the first network state sequence, and a network state at a later time point is ranked lower in the first network state sequence. For example, a network state at the time point of 12:01 is ranked before a network state at the time point of 12:02.

Through the above solution, the missing network states are filled based on the autoencoder. Because in the case that the network bandwidth is predicted in the embodiment of the present application, the collected network states are not directly adopted, but the collected missing network states at the plurality of time points are preset as the preset values, the first network state sequence is generated according to the network states at the plurality of time points, and the first network state sequence is processed through the autoencoder. The part, set as the preset values, in the first network state sequence can be predicted through the autoencoder, thus the situation of missing the network states does not exist in the second network state sequence output by the autoencoder, and therefore, prediction of the network bandwidth through the second network state sequence is more accurate.

In some embodiments, detailed introduction is made by taking an example that the preset values are 0, and setting the missing network states as the preset values may be regarded as zero padding.

In some embodiments, the network states at the different time periods need to be collected firstly to constitute a network state set, a counting time interval configured to count the network states is set, the network states are collected according to the set counting time interval, by taking an example that the network states represent download speeds, the counting time interval may be set to be 1 s, the download speed is counted once every second, and finally the network state set is composed of counted data.

Figure 3:
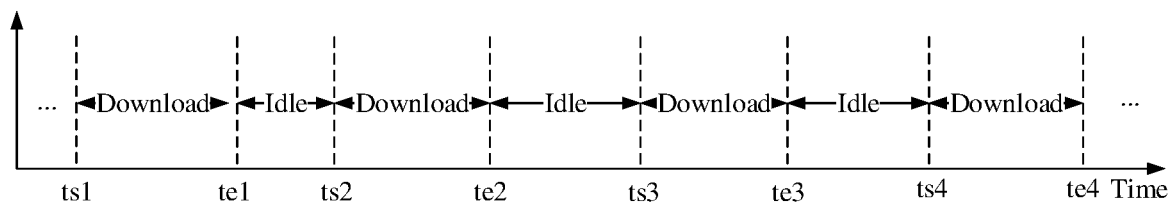
FIG. 3 is a schematic diagram of network states in a period of historical time according to an embodiment of the present disclosure.

In some embodiments, whether the network state is missing at one moment may be determined according to the data in the network state set, wherein the moment without collecting the download speeds is the moment missing the network states. Then the historical time period is divided into a plurality of continuous sub time periods, wherein sub time periods of the valid network states and sub time periods missing the network states in the plurality of continuous sub time periods mutually alternate, as shown in FIG. 3, $ts_1$-$te_1$, $ts_2$-$te_2$, $ts_3$-$te_3$, and $ts_4$-$te_4$ represent the sub time periods without missing the network states, and $te_1$-$ts_2$, $te_2$-$ts_3$, and $te_3$-$ts_4$ represent the sub time periods missing the network states.

In some embodiments, a symbol s(ts, te) is used for representing network states of the interval at the moment of ts-te, the network states here refer to a historical bandwidth, and thus the network states at the historical time period (referring to a historical interval) are S=[s($ts_1$, $te_1$), s($ts_2$, $te_2$), . . . , s($ts_n$, $te_n$)], which is a sequence constituted by a series of network states.

For $\forall i \geq 2$, $ts_i \geq te_{i-1}$ is always satisfied, that is, the time is not continuous, and a discontinuous part in the middle is the part missing the network states. For $\forall i \geq 2$, $[t_{e_{i-1}}, t_{s_i}]$ always exists, and the network states at these intervals are missing.

In some embodiments, a value of s(ts, te) is an average value of the network states collected in the time interval from a ts moment to a te moment. In the case that the network states are the download speeds, it is assumed that the time interval for collecting the download speeds is 1 s, that is, a current download speed is collected once every one second, for example, ts is 12:00, te is 12:15, thus the download speed is totally collected for 900 times in 15 minutes from 12:00-12:15, and an average value of the 900-time collected download speeds is at s(ts, te).

It is assumed that there is no downloading within 15 minutes after 12:15, that is, the download speeds are not collected in the sub time periods, thus the sub time periods are the sub time periods missing the network states, the network states of the sub time periods may be set as the preset values, and the network states at the time points belonging to the sub time periods are also the preset values.

If downloading is restarted within 12:30-12:32, the download speeds are totally collected for 120 times in the sub time periods, and the network states of the sub time periods are an average value of the 120-time collected download speeds.

Figure 4:
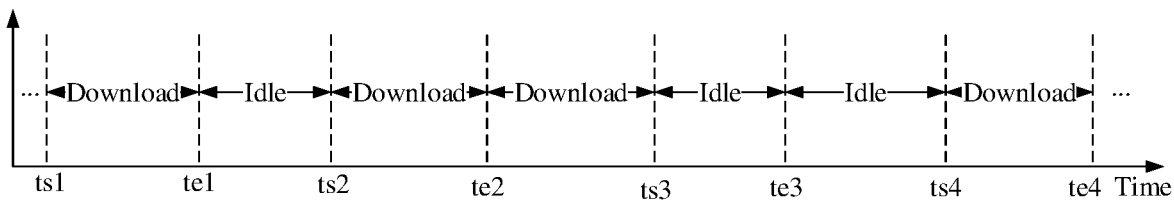
FIG. 4 is another schematic diagram of network states in a period of historical time according to an embodiment of the present disclosure.

In some embodiments, the plurality of continuous sub time periods may also be not in the form that the sub time periods of the valid network states and the sub time periods missing the network states mutually alternate. For example, $ts_1$-$te_1$ or $te_1$-$ts_2$ in FIG. 3 may be subdivided into a plurality of continuous sub time periods; or as shown in FIG. 4, $ts_1$-$te_1$, $ts_2$-$te_2$, $te_2$-$ts_3$, and $ts_4$-$te_4$ represent the sub time periods without missing the network states, and $te_1$-$ts_2$, $ts_3$-$te_3$, and $te_3$-$ts_4$ represent the sub time periods missing the network states.

In some embodiments, in order to make the entire historical network states realize discrete equal-interval sampling on time dimensionality, the sub time periods may be divided approximately at equal intervals according to the set time interval, and the plurality of time points are determined according to a dividing result.

In some embodiments, any sub time period is divided according to a timeslot (TS), the sub time periods are divided according to TS to obtain the plurality of time points, for example: the time points determined after dividing of $ts_1$-$te_1$ are $ts_1$+TS, $ts_1$+2*TS, $ts_1$+3*TS, . . . , $ts_1$+$k_1$*TS.

In some embodiments, the network states at the time points of the valid network states are determined through the following mode: determining the network states of the sub time periods to which the time points with the valid network states belong from the network state set; and setting the network states at the sub time periods to which the time points belong as the network states at the time points. For example, the sub time periods to which the time point 12:02:30 belongs are 12:02-12:03, the network states at the minute are set as the network states of the time point 12:02:30.

For example, for $\forall i$, s($ts_i$, $te_i$), may be always equivalent to:

$$s(ts_i+TS)=s(ts_i+2*TS)= \ldots =s(ts_i+k_i*TS)=s(ts_i,te_i).$$

Where s(t) represents a network state at a t moment, or s(t) represents network states of an interval from a t-TS moment to the t moment, and $k_i$ is a maximum integer meeting $ts_i+k_i*TS \leq te_i$.

Figure 5A:
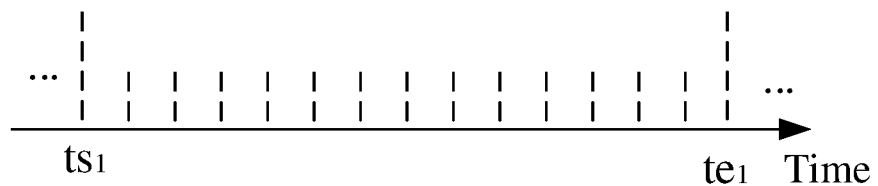
FIG. 5A is a schematic diagram of sub time period discretization according to an embodiment of the present disclosure.

FIG. 5A is a schematic diagram of sub time period discretization according to an embodiment of the present disclosure. $ts_1$-$te_1$ are divided as shown in FIG. 5A according to the timeslot, $ts_1$+13TS<$te_1$, $ts_1$+14TS>$te_1$, and thus $k_1$=13:

$$s(ts_1+TS)=s(ts_1+2*TS)= \ldots =s(ts_1+13*TS)=s(ts_1,te_1).$$

Figure 5B:
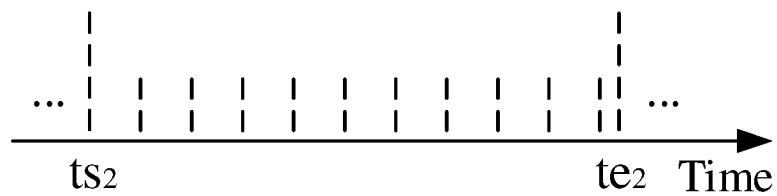
FIG. 5B is another schematic diagram of sub time period discretization according to an embodiment of the present disclosure.

FIG. 5B is another schematic diagram of sub time period discretization according to an embodiment of the present disclosure. $ts_2$-$te_2$ are divided as shown in FIG. 5B according to the timeslot, $ts_2$+11TS<$te_2$, $ts_2$+12TS>$te_2$, and thus $k_2$=11:

$$s(ts_2+TS)=s(ts_2+2*TS)= \ldots =s(ts_2+11*TS)=s(ts_2,te_2).$$

It should be noted that no matter whether s(t) represents the network state at the t moment or the network states of the interval from the t-TS moment to the t moment, the network state of s(t) is equivalent to the network state of the sub time period to which s(t) belongs.

In some embodiments, if $ts_i+k_i*TS<te_i$, a $te_1$ moment is specially processed, and the $te_1$ moment also serves as a time point. For example, $ts_1$-$te_1$ is 1.1 s, it is assumed that dividing is performed once every 200 ms, it may be divided into five 200 ms and one 100 ms, and the six time points obtained finally are respectively $ts_1$+200, $ts_1$+400, $ts_1$+600, $ts_1$+800, $ts_1$+1000 and $te_1$, wherein the network states of the six time points are equal to the network states at the sub time period of $ts_1$-$te_1$.

In some embodiments, the network states at the time points missing the network states are set as the preset values, for example, zero padding is performed on the part missing the network states, and the network states at the time points missing the network states are set to be 0. The first network state sequence is generated after the network states at the plurality of time points are sorted according to the chronological order, for example, the network states at the historical time period of $ts_1$-$te_n$ may be represented as:

$$S=[s(ts_1+TS), s(ts_1+2*TS), \ldots, s(ts_1+k_1*TS), 0, 0, \ldots, s(ts_2+TS), \ldots].$$

Figure 6A:
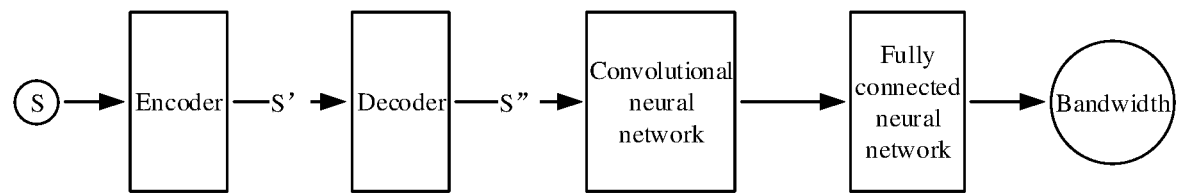
FIG. 6A is a schematic diagram of a system for bandwidth prediction according to an embodiment of the present disclosure.

In some embodiments, a network bandwidth of a missing part is predicted through an automatic coding machine, wherein the automatic coding machine includes an encoder and a decoder, as shown in FIG. 6A, the network state sequence S obtained after zero padding is input to the encoder in a form of a vector or a matrix and the like. In general, dimensionality of S will be high due to the missing network states. After passing through the encoder, a signal S' is obtained, and dimensionality of S' is much lower than that of S; and then S' enters the decoder to be subjected to dimensionality increasing processing to obtain S", dimensionality of S" is consistent with that of S, and its objective is to predict missing (replaced with zero) historical network states in S. A work flow of the automatic coding machine is from S to S", and during actual implementation, a classical and mature coding machine may be adopted for model training.

It should be noted that the encoder and the decoder in the automatic coding machine may also be implemented in a form of a neural network. Both the encoder and the decoder in FIG. 6A are designed as the neural networks, for example, the encoder may be designed as a dimensionality decreasing neural network, the decoder is designed as a dimensionality increasing neural network. It is a dimensionality decreasing process from S to S', namely, from high dimensionality to low dimensionality; and it is a dimensionality increasing process from S' to S" again, namely, returning from the low dimensionality to the high dimensionality, and S" and S are consistent in dimensionality. Dimensionality increasing or dimensionality decreasing refers to increasing or decreasing of dimensionality of the vector.

In some embodiments, an originally input first network state sequence is a vector with zero, a length is 100000, another vector is obtained through the dimensionality decreasing neural network, dimensionality is only 100, and then the dimensionality is recovered to be 100000 continuously through the dimensionality increasing neural network.

In some embodiments, in the case that both the encoder and the decoder in FIG. 6A are designed as the neural networks and after the first network state sequence is input into the autoencoder in the vector form, dimensionality decreasing processing is performed on the first network state sequence through the dimensionality decreasing neural network in the autoencoder, so as to obtain an intermediate network state sequence; and then dimensionality increasing processing is performed on the intermediate network state sequence through a dimensionality increasing neural network behind the dimensionality decreasing neural network in the autoencoder, and the network state sequence obtained after dimensionality increasing processing serves as a second network state sequence.

Parameters or functions in the dimensionality increasing neural network and the dimensionality decreasing neural network are determined during training.

In some embodiments, the autoencoder needs to determine the parameters of the neural networks in a training mode, such as a weight W and bias b, that is, at a training stage, repeated training is performed by constantly adjusting the parameters. After each training, the original first network state sequence S input into the autoencoder is compared with the second network state sequence S", so as to know whether output of the autoencoder is right or not and how much an error is, then repeated training is performed, and training stops when S" is kept consistent with S as much as possible.

In some embodiments, the autoencoder is trained in the following modes: generating a third network state sequence according to the collected network states at the plurality of time points and according to a chronological order; obtaining a fourth network state sequence by setting a valid network state at at least one time point in the third network state sequence as a preset value; and training the autoencoder by using the fourth network state sequence as an input feature, and using the third network state sequence as an output feature.

During training, model parameters are constantly iterated through a difference between an output sequence during training and a real sequence, so as to find internal relations among all values, namely, feature information between the missing network states and the real network states. During actual use, an output value is computed through a model.

The autoencoder in the embodiment of the present application may predict the missing network states after being trained. A hidden layer h is in the antoencoder and may generate a code to represent input. The network may be regarded as being composed of the two parts: one is an encoder (may be understood as an encoding layer for dimensionality decreasing processing) represented by a function h=f(x), and the other is a decoder r=g(h) (may be understood as a decoding layer for dimensionality increasing processing) for generating reconstruction. The autoencoder is a neural network with three or more layers, an input expression X is encoded as a new expression Y, and then Y is decoded back into X. This is an unsupervised learning algorithm, and an Error Back Propagation (BP) algorithm is used to train the network, so that output is equal to input.

Figure 6B:
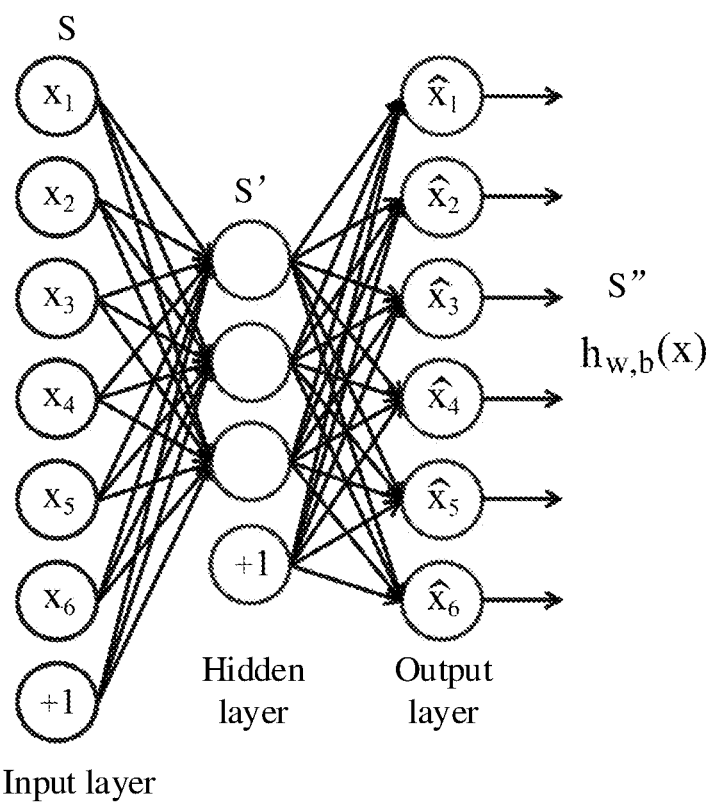
FIG. 6B is a schematic diagram of an autoencoder structure according to an embodiment of the present disclosure.

FIG. 6B is a schematic structural diagram of an autoencoder according to an embodiment of the present disclosure. A neural network includes an input layer, a hidden layer and an output layer. $x_1, x_2, x_3, \ldots$ on the left are operational input values, 1 represents nodal increment, then each of arrow lines from input to a middle circle is attached with weight W (a length is equal to the input number+the nodal increment number 1), the middle circle represents an activation function $f(\cdot)$, and there are usually an s activation function (sigmoid, a value range 0-1) and a hyperbolic tangent function (tanh, a value range −1-1). The final h(x) represents output:

$$h_{w,b}(x) = f(W^T x) = \sum_{i=1}^{3} W_i x_i + b.$$

In the autoencoder, in addition to the last output layer, data of each layer contain an extra bias node, namely, nodal increment, as shown in FIG. 6B, nodal increment of both the input layer and the hidden layer is 1. Each straight line with an arrow represents one weight (except for the straight line behind the output layer). Circles in the middle and the right side represent activation processing of a weighted sum of all its direct input data.

In some embodiments, in a process of training an autoencoder model, a law is mainly searched for according to a numerical value of an actual network state at the time points without missing the network states, the network state at the time points missing the network states is predicted, and a prediction result is made to be accurate as much as possible through repeated training.

In some embodiments, in the case that the input X is the signal S, the output Y represents S", wherein $x_1$, $x_2$, $x_3$, . . . may represent the network states at the time points in the input network state sequence, $\hat{x}_1$, $\hat{x}_2$, $\hat{x}_3$, . . . may represent the network states at the time points in the second network state sequence, for example, the input S contains $x_1$-$x_6$, which are respectively 2, 3, 2, 0, 0 and 1; the output S" contains $\hat{x}_1$-$\hat{x}_6$, which are respectively 2, 3.01, 1.90, 1.50, 2.50 and 1, wherein the part without missing the network states is 2, 3, 2 and 1, S output by the part without missing the network states is 2, 3.01, 1.90 and 1, the output of the part missing the network states is 1.50 and 2.50, that is, 1.50 and 2.50 are predicted values of the part missing the network states obtained through the autoencoder.

It should be noted that the above listed structure of the antoencoder is only distance illustration, which may be adjusted specifically with reference to the actual condition.

In some embodiments, the network state at the next moment is predicted according to the second network state sequence S". If the network state represents a bandwidth, a network bandwidth of the next moment may be predicted according to the second network state sequence.

Because the second network state sequence S" is a complete historical state sequence, the bandwidth of the next moment may be predicted subsequently by adopting any existing bandwidth prediction mode, wherein the next moment refers to a next moment aiming at the historical time period.

In some embodiments, the historical time period is 12:00:00-12:15:00, if the download speed (network state) is collected once every second, the next moment refers to 12:15:01, and the download speed (network state) at 12:15:01 may be predicted according to a network state sequence corresponding to the historical time period 12:00:00-12:15:00.

In some embodiments, there are many modes of predicting the network bandwidth according to the second network state sequence, and several modes are listed below.

A prediction mode 1, the network bandwidth is predicted based on an average value of the network states in the second network state sequence.

In some embodiments, the second network state sequence S" is (1, 2, 3, 4, 5, 6, 7, 8, 9, 10), it is assumed that a time interval set in the case that the time points are determined is 200 ms, the historical time period corresponding to the network state sequence is 12:01-12:03, and the bandwidth of the next moment refers to the bandwidth at a 12:04 moment and is:

(1+2+3+4+5+6+7+8+9+10)/10=5.5.

It should be noted that for more accurate description, 5.5 represents a prediction result of the bandwidth at a moment of 200 ms of 12:03. Because an equivalent mode is used in the case that the network states at the time points are determined in a process of generating a network bandwidth sequence, it may be understood that the network state at 12:04 is equivalent to the network state at 200 ms of 12:03.

A prediction mode 2, a bandwidth curve is obtained by fitting the network states in the second network state sequence based on a regression prediction model, and the network bandwidth is predicted based on the bandwidth curve.

Figure 7:
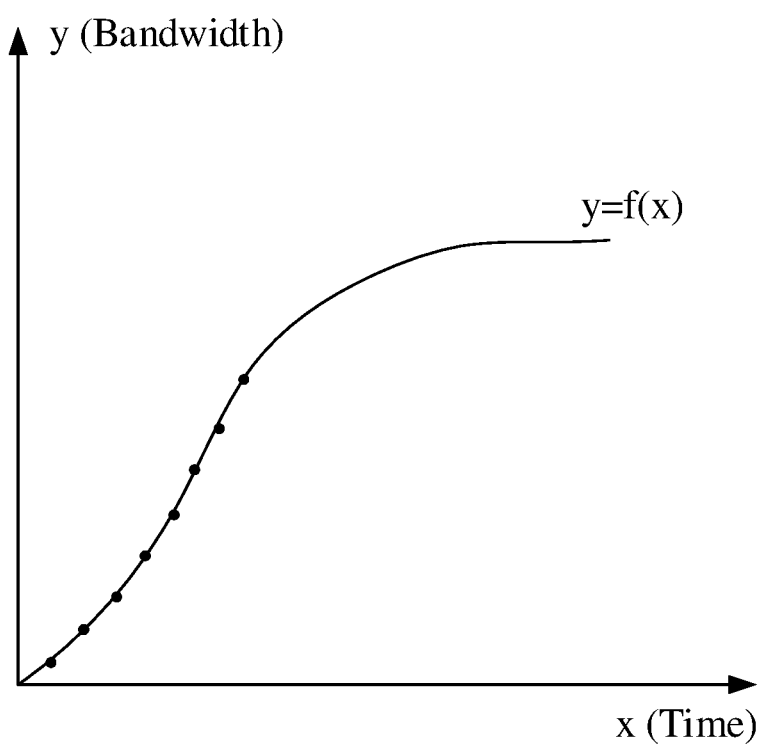
FIG. 7 is a schematic diagram of a bandwidth curve according to an embodiment of the present disclosure.

In some embodiments, the network states at all the time points in the network state sequence are fit through the regression prediction model, and the network bandwidth at the next moment is predicted by utilizing the bandwidth curve obtained through fitting. It is assumed that an expression of the bandwidth curve is y=f(x), as shown in FIG. 7, where x represents the moment, f(x) is a quadratic function, in the case that a network bandwidth at a certain moment needs to be predicted, the time at the moment is regarded as x and substituted into the expression to solve y, and the solved y is the predicted bandwidth.

A prediction mode 3, the network bandwidth is predicted by inputting the second network state sequence into a bandwidth prediction neural network model.

In some embodiments, the bandwidth prediction neural network model includes a convolutional neural network and a fully connected neural network which are both used for feature extraction. Firstly, the second network state sequence is input into the convolutional neural network for features extraction; and then the features extracted after the features extraction of the convolutional neural network are input into the fully connected neural network for features extraction again, and the network bandwidth is predicted through the fully connected neural network.

As shown in FIG. 6A, S" is subjected to feature extraction through the convolutional neural networks (CNNs) and then subjected to feature extraction through the fully connected (FCs) neural network to output the predicted network bandwidth.

Generally, a basic structure of CNN includes two layers, one is a feature extraction layer, input of each neuron is connected with a local acceptable domain of a previous layer, and a feature of the local is extracted. Once the local feature is extracted, a positional relationship between the local feature and other features is determined accordingly. The other one is a feature map layer, each computing layer of the network is composed of a plurality of feature maps, each feature map is a plane, and weight values of all neurons on the plane are equal. A feature map structure adopts a sigmoid function with a small influence function kernel as an activation function of the convolutional neural network, so that the feature maps have shifting invariance. In addition, because the neurons on one map plane share the weight values, the number of network free parameters is reduced. Each convolutional layer in the convolutional neural network is immediately followed by a computing layer for solving local average and performing secondary extraction, and the specific two-time feature extraction structure reduces a feature resolution.

In some embodiments, the fully connected neural network refers to a fully-connected neural network. As for an n−1 layer and an n layer, any node in the n−1 layer is connected with all nodes at the n<th> layer. That is, in the case that each node at the n<th> layer is computed, the input of the activation function is weighting of all the nodes at the n−1 layer.

It should be noted that the structure of the bandwidth prediction neural network listed in the embodiment of the present application is only illustration, and any neural network capable of realizing bandwidth prediction is suitable for the embodiment of the present application.

In some embodiments, the discontinuous part missing the network states is subjected to zero padding, then the network state sequence is generated through dividing of the timeslot, the network states at the part missing the network states are filled through the autoencoder, then final bandwidth prediction is performed in a learning mode, specifically, one convolutional neural network and one fully connected neural network are connected behind the autoencoder, wherein there may be one or more layers of convolutional neural networks and fully connected neural networks, which depends on requirements of services for a network depth and complexity. Under the condition of missing the historical network states, completion is performed through the autoencoder, and then bandwidth estimation is performed through the convolutional neural network and the fully connected neural network, thereby being capable of adapting to various transmission environments, and improving bandwidth prediction accuracy.

Figure 8:
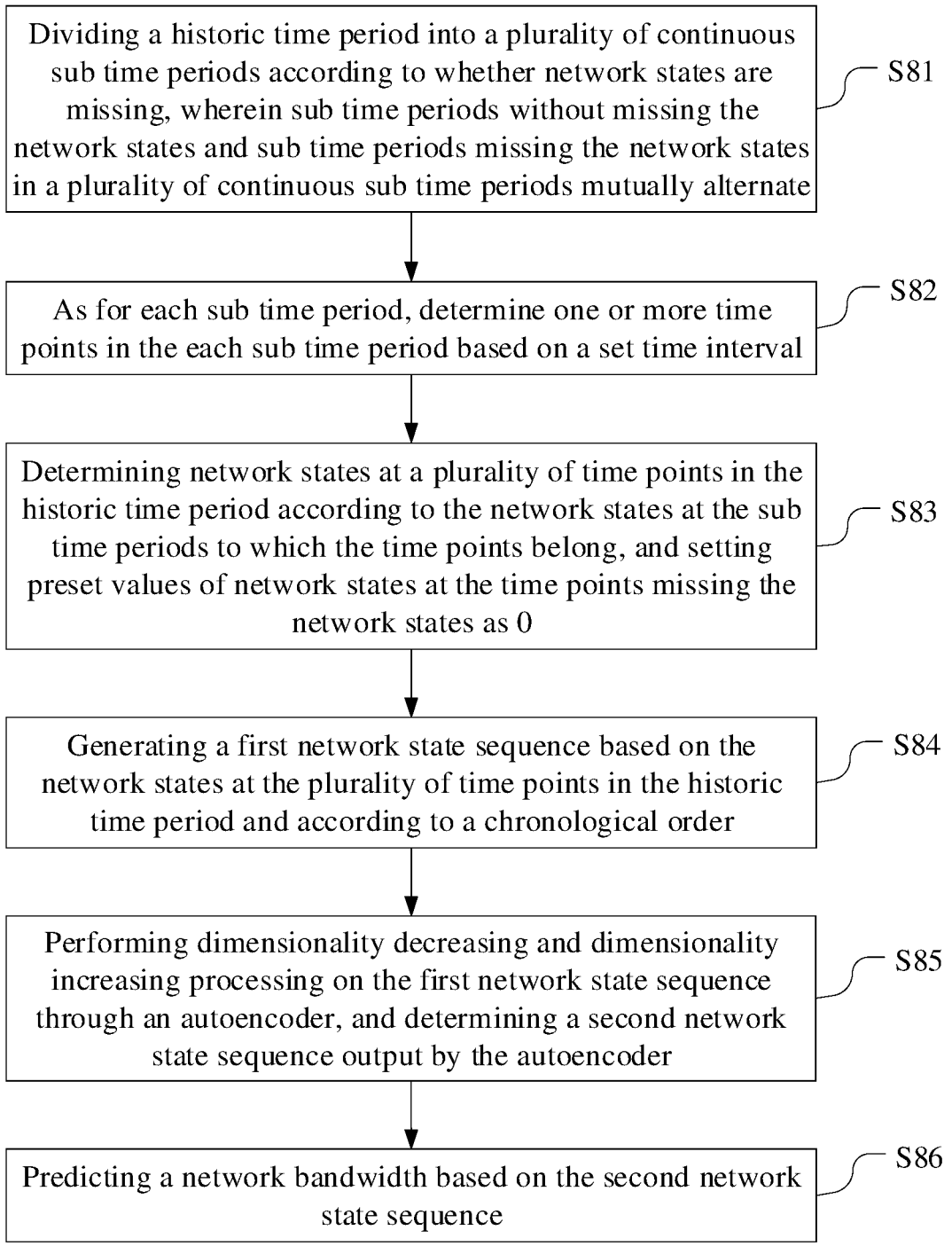
FIG. 8 is a flow diagram of a method for bandwidth prediction according to an embodiment of the present disclosure.

FIG. 8 is a flow diagram of a method for bandwidth prediction according to an embodiment of the present disclosure, including the following steps.

In S81, a historic time period is divided into a plurality of continuous sub time periods according to whether network states are missing. Sub time periods of valid network states and sub time periods of the missing network states in a plurality of continuous sub time periods mutually alternate.

In S82, as for each sub time period, one or more time points in the sub time period are determined based on a set time interval.

In S83, network states at a plurality of time points in the historic time period are determined according to the network states at the sub time periods to which the time points belong, and preset values of network states at the time points missing the network states are set as 0.

In S84, a first network state sequence is generated according to the network states at the plurality of time points in the historic time period and according to a chronological order.

In S85, the network state sequence is subjected to dimensionality decreasing and dimensionality increasing processing through an autoencoder, and then a second network state sequence output by the autoencoder is determined.

In S86, a network bandwidth is predicted according to the second network state sequence.

It should be noted that in S86, there are many modes of predicting the network bandwidth according to the second network state sequence, for example, according to the average value of the network state sequence or the bandwidth curve obtained through the regression prediction model or the bandwidth prediction neural network model listed in the above embodiments, specific processes of the different prediction modes are similar to that of the above embodiments, and repetitions are omitted.

Figure 9:
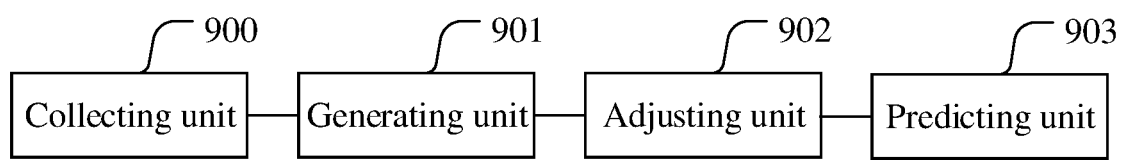
FIG. 9 is a block diagram of an apparatus for bandwidth prediction according to an embodiment of the present disclosure.

FIG. 9 is a block diagram of an apparatus for bandwidth prediction according to an embodiment of the present disclosure. Referring to FIG. 9, the apparatus includes a collecting unit 900, a generating unit 901, an adjusting unit 902 and a predicting unit 903.

The collecting unit 900 is configured to acquire valid network states at a plurality of time points within a historical time period, and set missing network states at the plurality of time points as preset values.

The generating unit 901 is configured to generate a first network state sequence from the network states at the plurality of time points according to a chronological order.

The adjusting unit 902 is configured to input the first network state sequence into a trained autoencoder, and obtain a second network state sequence output by the autoencoder by converting the missing network states in the first network state sequence into predicted network states based on feature information between the missing network states and real network states in the autoencoder, wherein the network states at the plurality of time points include the valid network states and/or the missing network states.

The predicting unit 903 is configured to predict a network bandwidth based on the second network state sequence.

In some embodiments, the generating unit 901 is further configured to execute: before generating the first network state sequence from the network states at the plurality of time points according to the chronological order, dividing the historic time period into a plurality of continuous sub time periods based on the network states, wherein sub time periods of the valid network states and sub time periods of the missing network states in the plurality of continuous sub time periods mutually alternate; and as for each sub time period, determining one or more time points in the each sub time period based on a set time interval.

In some embodiments, the generating unit 901 is further configured to determine the valid network states at the time points by setting the network states at the sub time periods to which the time points belong as the valid network states at the time points.

In some embodiments, the adjusting unit 902 is further configured to execute: after inputting the first network state sequence into the autoencoder in a vector form, obtaining an intermediate network state sequence by performing dimensionality decreasing processing on the first network state sequence based on a dimensionality decreasing function in the feature information, wherein the dimensionality decreasing processing represents reducing a dimensionality of the first network state sequence; and obtaining the second network state sequence by performing dimensionality increasing processing on the intermediate network state sequence based on a dimensionality increasing function in the feature information, wherein the dimensionality increasing processing represents increasing a dimensionality of the intermediate network state sequence.

In some embodiments, the predicting unit 903 is further configured to execute: predicting the network bandwidth based on an average value of the network states in the second network state sequence; or obtaining a bandwidth curve by fitting the network states in the second network state sequence based on a regression prediction model, and predicting the network bandwidth based on the bandwidth curve; or predicting the network bandwidth by inputting the second network state sequence into a bandwidth prediction neural network model.

In some embodiments, the bandwidth prediction neural network model includes a convolutional neural network and a fully connected neural network.

The predicting unit 903 is further configured to execute: extracting features of the second network state sequence based on the convolutional neural network; and predicting the network bandwidth by inputting the features into the fully connected neural network.

As for the apparatus in the above embodiment, the specific modes that all units execute the request have been described in detail in the embodiment related to the method, which will not be illustrated in detail here.

Figure 10:
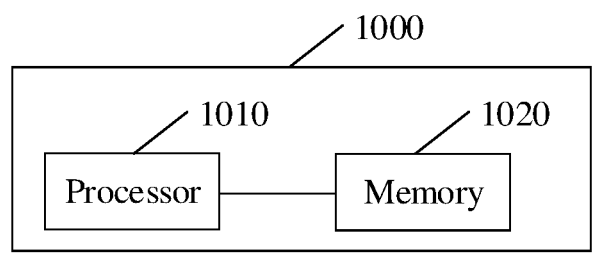
FIG. 10 is a block diagram of an electronic device according to an embodiment of the present disclosure.

FIG. 10 is a block diagram of an electronic device 1000 according to an embodiment of the present disclosure. The device includes: a processor 1010, and a memory 1020 configured to store an executable instruction of the processor 1010.

The processor 1010 is configured to execute: acquiring valid network states at a plurality of time points within a historical time period, and setting missing network states at the plurality of time points as preset values; generating a first network state sequence from network states at the plurality of time points according to a chronological order; inputting the first network state sequence into a trained autoencoder, and obtaining a second network state sequence output by the autoencoder by converting the missing network states in the first network state sequence into predicted network states based on feature information between the missing network states and real network states in the autoencoder, wherein the network states at the plurality of time points include the valid network states and/or the missing network states; and predicting a network bandwidth based on the second network state sequence.

In some embodiments, the processor 1010 is further configured to execute: before generating the network state sequence according to the network states at the plurality of time points in the historic time period and according to the chronological order, dividing the historic time period into a plurality of continuous sub time periods based on the network states, wherein sub time periods of the valid network states and sub time periods of the missing network states in the plurality of continuous sub time periods mutually alternate; and as for each sub time period, determining one or more time points in the each sub time period based on a set time interval.

In some embodiments, the processor 1010 is further configured to determine the valid network states at the time points by setting the network states at the sub time periods to which the time points belong as the valid network states at the time points.

In some embodiments, the processor 1010 is further configured to execute: after inputting the first network state sequence into the autoencoder in a vector form, obtaining an intermediate network state sequence by performing dimensionality decreasing processing on the first network state sequence based on a dimensionality decreasing function in the feature information, wherein the dimensionality decreasing processing represents reducing a dimensionality of the first network state sequence; and obtaining the second network state sequence by performing dimensionality increasing processing on the intermediate network state sequence based on a dimensionality increasing function in the feature information, wherein the dimensionality increasing processing represents increasing a dimensionality of the intermediate network state sequence.

In some embodiments, the processor 1010 is further configured to execute: predicting the network bandwidth based on an average value of the network states in the second network state sequence; or obtaining a bandwidth curve by fitting the network states in the second network state sequence based on a regression prediction model, and predicting the network bandwidth based on the bandwidth curve; or predicting the network bandwidth by inputting the second network state sequence into a bandwidth prediction neural network model.

In some embodiments, the bandwidth prediction neural network model includes a convolutional neural network and a fully connected neural network.

The processor 1010 is further configured to execute: extracting features of the second network state sequence based on the convolutional neural network; and predicting the network bandwidth by inputting the features into the fully connected neural network.

In some embodiments, a storage medium including an instruction is further provided, for example, a memory 1020 including an instruction, and the above instruction may be executed by a processor 1010 of an electronic device 1000 so as to complete the above method. Optionally, the storage medium may be a non-temporary computer readable storage medium, for example, the non-temporary computer readable storage medium may be ROM, a random access memory (RAM), CD-ROM, a magnetic tape, a floppy disk, an optical data storage device, and the like.

An embodiment of the present application further provides a computer program product. The computer program product, when running on an electronic device, causes the electronic device to execute and implement the above any bandwidth prediction method of the embodiment of the present application or a method possibly related to any bandwidth prediction method.

Those skilled in the art will easily think of other implementation solutions of the present application after considering the specification and practicing the invention disclosed here. The present application aims at covering any modification, use or adaptive change of the present application, these modifications, uses or adaptive changes follow a general principle of the present application and include a common general knowledge and a conventional technical means in the present technical field not disclosed in the present application. The specification and the embodiments are only regarded as exemplary, and the real scope and spirit of the present application are pointed out by the following claim.

It should be understood that the present application is not limited to a precise structure described above and shown in the drawings, and various modifications and changes may be made without departing from its scope. The scope of the present application is only limited by the appended claim.

What is claimed is:

1. A method for bandwidth prediction, comprising:
acquiring valid network states at a plurality of time points within a historical time period, and setting missing network states at the plurality of time points as preset values;
generating a first network state sequence from network states at the plurality of time points according to a chronological order;
inputting the first network state sequence into a trained autoencoder, and obtaining a second network state sequence output by the autoencoder by converting the missing network states in the first network state sequence into predicted network states based on feature information between the missing network states and real network states in the autoencoder, wherein the network states at the plurality of time points comprise the valid network states and the missing network states; and
predicting a network bandwidth based on the second network state sequence.

2. The method for bandwidth prediction according to claim 1, wherein before said generating the first network state sequence from the network states at the plurality of time points according to the chronological order, the method further comprises:
dividing the historic time period into a plurality of continuous sub time periods based on the network states, wherein sub time periods of the valid network states and sub time periods of the missing network states in the plurality of continuous sub time periods mutually alternate; and
as for each of the plurality of continuous sub time periods, determining one or more time points in the each sub time period based on a set time interval.

3. The method for bandwidth prediction according to claim 2, wherein the valid network states at the time points are determined by:
setting the network states at the sub time periods to which the time points belong as the valid network states at the time points.

4. The method for bandwidth prediction according to claim 1, wherein said inputting the first network state sequence into the trained autoencoder, and obtaining the second network state sequence output by the autoencoder by converting the missing network states in the first network state sequence into the predicted network states based on the feature information between the missing network states and the real network states in the autoencoder, comprises:
after inputting the first network state sequence into the autoencoder in a vector form, obtaining an intermediate network state sequence by performing dimensionality decreasing processing on the first network state sequence based on a dimensionality decreasing function in the feature information, wherein the dimensionality decreasing processing represents reducing a dimensionality of the first network state sequence; and
obtaining the second network state sequence by performing dimensionality increasing processing on the intermediate network state sequence based on a dimensionality increasing function in the feature information, wherein the dimensionality increasing processing represents increasing a dimensionality of the intermediate network state sequence.

5. The method for bandwidth prediction according to claim 1, wherein said predicting the network bandwidth based on the second network state sequence, comprises:
predicting the network bandwidth based on an average value of the network states in the second network state sequence; or
obtaining a bandwidth curve by fitting the network states in the second network state sequence based on a regression prediction model, and predicting the network bandwidth based on the bandwidth curve; or
predicting the network bandwidth by inputting the second network state sequence into a bandwidth prediction neural network model.

6. The method for bandwidth prediction according to claim 5, wherein the bandwidth prediction neural network model comprises a convolutional neural network and a fully connected neural network; and
said predicting the network bandwidth by inputting the second network state sequence into the bandwidth prediction neural network model, comprises:
extracting features of the second network state sequence based on the convolutional neural network; and
predicting the network bandwidth by inputting the features into the fully connected neural network.

7. An apparatus for bandwidth prediction, comprising:
a processor, and
a memory configured to store executable instructions of the processor, wherein
the processor is configured to execute the instructions to perform steps of:
acquiring valid network states at a plurality of time points within a historical time period, and setting missing network states at the plurality of time points as preset values;
generating a first network state sequence from network states at the plurality of time points according to a chronological order;
inputting the first network state sequence into a trained autoencoder, and obtaining a second network state sequence output by the autoencoder by converting the missing network states in the first network state sequence into predicted network states based on feature information between the missing network states and real network states in the autoencoder, wherein the network states at the plurality of time points comprise the valid network states and the missing network states; and
predicting a network bandwidth based on the second network state sequence.

8. The apparatus for bandwidth prediction according to claim 7, wherein the processor is further configured to execute the instructions to perform steps of:
before generating the first network state sequence from the network states at the plurality of time points according to the chronological order, dividing the historic time period into a plurality of continuous sub time periods based on the network states, wherein sub time periods of the valid network states and sub time periods of the missing network states in the plurality of continuous sub time periods mutually alternate; and
as for each sub time period, determining one or more time points in the each sub time period based on a set time interval.

9. The apparatus for bandwidth prediction according to claim 8, wherein the processor is further configured to execute the instructions to perform steps of:
setting the network states at the sub time periods to which the time points belong as the valid network states at the time points.

10. The apparatus for bandwidth prediction according to claim 7, wherein the processor is further configured to execute the instructions to perform steps of:
after inputting the first network state sequence into the autoencoder in a vector form, obtaining an intermediate network state sequence by performing dimensionality decreasing processing on the first network state sequence based on a dimensionality decreasing function in the feature information, wherein the dimensionality decreasing processing represents reducing a dimensionality of the first network state sequence; and
obtaining the second network state sequence by performing dimensionality increasing processing on the intermediate network state sequence based on a dimensionality increasing function in the feature information, wherein the dimensionality increasing processing represents increasing a dimensionality of the intermediate network state sequence.

11. The apparatus for bandwidth prediction according to claim 7, wherein the processor is further configured to execute the instructions to perform steps of:

predicting the network bandwidth based on an average value of the network states in the second network state sequence; or obtaining a bandwidth curve by fitting the network states in the second network state sequence based on a regression prediction model, and predicting the network bandwidth based on the bandwidth curve; or predicting the network bandwidth by inputting the second network state sequence into a bandwidth prediction neural network model.

12. The apparatus for bandwidth prediction according to claim 11, wherein the bandwidth prediction neural network model comprises a convolutional neural network and a fully connected neural network; and the processor is further configured to execute the instructions to perform steps of:

extracting features of the second network state sequence based on the convolutional neural network; and predicting the network bandwidth by inputting the features into the fully connected neural network.

13. A non-transitory storage medium, wherein instructions in the storage medium is executed by a processor of an electronic device to cause the electronic device to perform:

acquiring valid network states at a plurality of time points within a historical time period, and setting missing network states at the plurality of time points as preset values;

generating a first network state sequence from network states at the plurality of time points according to a chronological order;

inputting the first network state sequence into a trained autoencoder, and obtaining a second network state sequence output by the autoencoder by converting the missing network states in the first network state sequence into predicted network states based on feature information between the missing network states and real network states in the autoencoder, wherein the network states at the plurality of time points comprise the valid network states and the missing network states; and predicting a network bandwidth based on the second network state sequence.

* * * * *